United States Patent
Dimou et al.

(10) Patent No.: US 12,408,061 B2
(45) Date of Patent: Sep. 2, 2025

(54) TECHNIQUES FOR LAYER 3 MOBILITY MEASUREMENT DURING CELL DISCONTINUOUS TRANSMISSION

(71) Applicant: QUALCOMM Incorporated, San Diego, CA (US)

(72) Inventors: Konstantinos Dimou, New York, NY (US); Yan Zhou, San Diego, CA (US); Jianghong Luo, Skillman, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 18/160,828

(22) Filed: Jan. 27, 2023

(65) Prior Publication Data

US 2024/0259849 A1    Aug. 1, 2024

(51) Int. Cl.
*H04W 24/10* (2009.01)
*H04W 76/28* (2018.01)

(52) U.S. Cl.
CPC ......... *H04W 24/10* (2013.01); *H04W 76/28* (2018.02)

(58) Field of Classification Search
CPC .............................. H04W 24/10; H04W 76/28
See application file for complete search history.

(56) References Cited

U.S. PATENT DOCUMENTS

| | | | |
|---|---|---|---|
| 2021/0058127 A1* | 2/2021 | Li | H04L 5/0053 |
| 2022/0167397 A1* | 5/2022 | Thangarasa | H04W 74/08 |
| 2022/0330339 A1* | 10/2022 | Siomina | H04W 74/0816 |
| 2024/0284215 A1* | 8/2024 | Alfarhan | H04B 7/06964 |

* cited by examiner

*Primary Examiner* — Austin J Moreau
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive a configuration indicating a threshold for layer 3 (L3) measurements missed within a measurement period and during inactive periods of a cell discontinuous transmission (DTX) pattern. The UE may perform an adjusted mobility event detection procedure based at least in part on a quantity of L3 mobility measurements missed within the measurement period satisfying the threshold. Numerous other aspects are described.

30 Claims, 10 Drawing Sheets

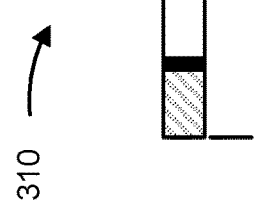
FIG. 3A
FIG. 3B

TECHNIQUES FOR LAYER 3 MOBILITY MEASUREMENT DURING CELL DISCONTINUOUS TRANSMISSION

FIELD OF THE DISCLOSURE

Aspects of the present disclosure generally relate to wireless communication and to techniques and apparatuses for layer 3 (L3) mobility measurement during cell discontinuous transmission (DTX).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving a configuration indicating a threshold for layer 3 (L3) measurements missed within a measurement period and during inactive periods of a cell discontinuous transmission (DTX) pattern. The method may include performing an adjusted mobility event detection procedure based at least in part on a quantity of L3 mobility measurements missed within the measurement period satisfying the threshold.

Some aspects described herein relate to a method of wireless communication performed by a UE. The method may include receiving a configuration indicating that an inactive period of a cell DTX pattern is to be ignored. The method may include performing a mobility event detection procedure based at least in part on the configuration indicating that the inactive period of the cell DTX pattern is to be ignored.

Some aspects described herein relate to a method of wireless communication performed by a UE. The method may include receiving a configuration for a signal to be received during an active period of a cell DTX pattern. The method may include receiving the signal during the active period of the cell DTX pattern based at least in part on the configuration. The method may include performing a mobility event detection procedure based at least in part on an L3 measurement associated with the signal received during the active period of the DTX pattern.

Some aspects described herein relate to a method of wireless communication performed by a UE. The method may include receiving a configuration indicating that a signal is to be received during an inactive period of a cell DTX pattern. The method may include receiving the signal during the inactive period of the cell DTX pattern based at least in part on the configuration. The method may include performing a mobility event detection procedure based at least in part on an L3 measurement associated with the signal received during the inactive period of the cell DTX pattern.

Some aspects described herein relate to a UE for wireless communication. The UE may include a memory and one or more processors coupled to the memory. The one or more processors may be configured to receive a configuration indicating a threshold for L3 measurements missed within a measurement period and during inactive periods of a cell DTX pattern. The one or more processors may be configured to perform an adjusted mobility event detection procedure based at least in part on a quantity of L3 mobility measurements missed within the measurement period satisfying the threshold.

Some aspects described herein relate to a UE for wireless communication. The UE may include a memory and one or more processors coupled to the memory. The one or more processors may be configured to receive a configuration indicating that an inactive period of a cell DTX pattern is to be ignored. The one or more processors may be configured to perform a mobility event detection procedure based at least in part on the configuration indicating that the inactive period of the cell DTX pattern is to be ignored.

Some aspects described herein relate to a UE for wireless communication. The UE may include a memory and one or more processors coupled to the memory. The one or more processors may be configured to receive a configuration for a signal to be received during an active period of a cell DTX pattern. The one or more processors may be configured to receive the signal during the active period of the cell DTX pattern based at least in part on the configuration. The one or more processors may be configured to perform a mobility event detection procedure based at least in part on an L3 measurement associated with the signal received during the active period of the DTX pattern.

Some aspects described herein relate to a UE for wireless communication. The UE may include a memory and one or more processors coupled to the memory. The one or more processors may be configured to receive a configuration indicating that a signal is to be received during an inactive period of a cell DTX pattern. The one or more processors may be configured to receive the signal during the inactive period of the cell DTX pattern based at least in part on the configuration. The one or more processors may be configured to perform a mobility event detection procedure based at least in part on an L3 measurement associated with the signal received during the inactive period of the cell DTX pattern.

Some aspects described herein relate to a non-transitory computer-readable medium that stores a set of instructions for wireless communication by a UE. The set of instructions, when executed by one or more processors of the UE, may cause the UE to receive a configuration indicating a threshold for L3 measurements missed within a measurement period and during inactive periods of a cell DTX pattern. The set of instructions, when executed by one or more processors of the UE, may cause the UE to perform an adjusted mobility event detection procedure based at least in part on a quantity of L3 mobility measurements missed within the measurement period satisfying the threshold.

Some aspects described herein relate to a non-transitory computer-readable medium that stores a set of instructions for wireless communication by a UE. The set of instructions, when executed by one or more processors of the UE, may cause the UE to receive a configuration indicating that an inactive period of a cell DTX pattern is to be ignored. The set of instructions, when executed by one or more processors of the UE, may cause the UE to perform a mobility event detection procedure based at least in part on the configuration indicating that the inactive period of the cell DTX pattern is to be ignored.

Some aspects described herein relate to a non-transitory computer-readable medium that stores a set of instructions for wireless communication by a UE. The set of instructions, when executed by one or more processors of the UE, may cause the UE to receive a configuration for a signal to be received during an active period of a cell DTX pattern. The set of instructions, when executed by one or more processors of the UE, may cause the UE to receive the signal during the active period of the cell DTX pattern based at least in part on the configuration. The set of instructions, when executed by one or more processors of the UE, may cause the UE to perform a mobility event detection procedure based at least in part on an L3 measurement associated with the signal received during the active period of the DTX pattern.

Some aspects described herein relate to a non-transitory computer-readable medium that stores a set of instructions for wireless communication by a UE. The set of instructions, when executed by one or more processors of the UE, may cause the UE to receive a configuration indicating that a signal is to be received during an inactive period of a cell DTX pattern. The set of instructions, when executed by one or more processors of the UE, may cause the UE to receive the signal during the inactive period of the cell DTX pattern based at least in part on the configuration. The set of instructions, when executed by one or more processors of the UE, may cause the UE to perform a mobility event detection procedure based at least in part on an L3 measurement associated with the signal received during the inactive period of the cell DTX pattern.

Some aspects described herein relate to an apparatus for wireless communication. The apparatus may include means for receiving a configuration indicating a threshold for L3 measurements missed within a measurement period and during inactive periods of a cell DTX pattern. The apparatus may include means for performing an adjusted mobility event detection procedure based at least in part on a quantity of L3 mobility measurements missed within the measurement period satisfying the threshold.

Some aspects described herein relate to an apparatus for wireless communication. The apparatus may include means for receiving a configuration indicating that an inactive period of a cell DTX pattern is to be ignored. The apparatus may include means for performing a mobility event detection procedure based at least in part on the configuration indicating that the inactive period of the cell DTX pattern is to be ignored.

Some aspects described herein relate to an apparatus for wireless communication. The apparatus may include means for receiving a configuration for a signal to be received during an active period of a cell DTX pattern. The apparatus may include means for receiving the signal during the active period of the cell DTX pattern based at least in part on the configuration. The apparatus may include means for performing a mobility event detection procedure based at least in part on an L3 measurement associated with the signal received during the active period of the DTX pattern.

Some aspects described herein relate to an apparatus for wireless communication. The apparatus may include means for receiving a configuration indicating that a signal is to be received during an inactive period of a cell DTX pattern. The apparatus may include means for receiving the signal during the inactive period of the cell DTX pattern based at least in part on the configuration. The apparatus may include means for performing a mobility event detection procedure based at least in part on an L3 measurement associated with the signal received during the inactive period of the cell DTX pattern.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating examples associated with cell discontinuous transmission (DTX).

DETAILED DESCRIPTION

Figure 1:
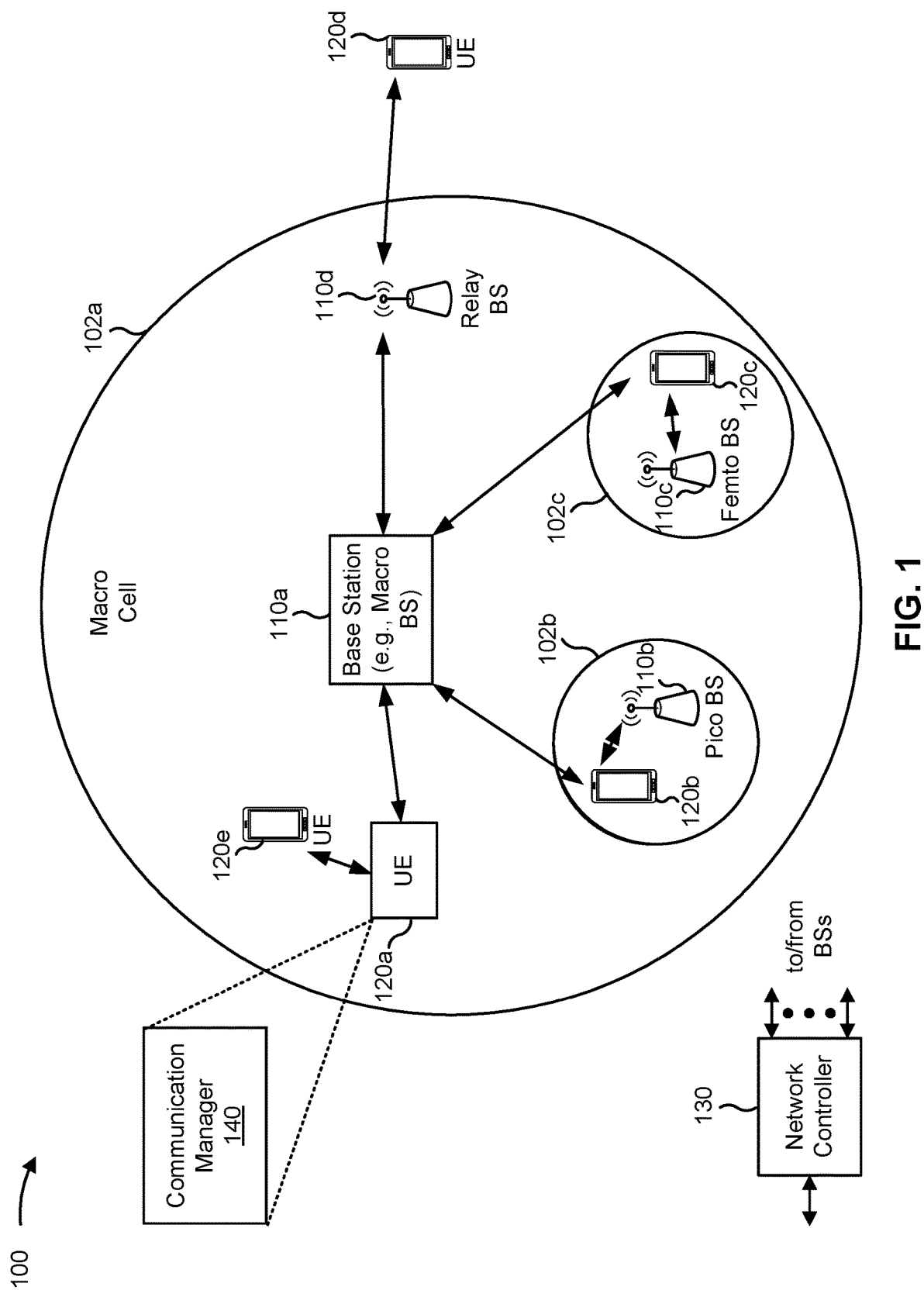
FIG. 1 is a diagram illustrating an example of a wireless network.

A user equipment (UE) may be configured to perform layer 3 (L3) mobility measurements based on one or more signals transmitted by a network node. However, some resources on which the signal is to be transmitted may fall within inactive periods of a cell discontinuous transmission (DTX) pattern of the network node, meaning that the network node does not transmit the signal in those resources. As a result, the UE may miss multiple L3 mobility measurements during a given measurement period as a result of cell DTX. The missed L3 mobility measurements may negatively impact mobility event detection by, for example, causing the UE to fail to detect a mobility event or to erroneously detect a mobility event. Techniques and apparatuses described herein enable enhanced L3 mobility measurement during cell DTX. In some aspects, a UE may receive a configuration indicating a threshold for L3 measurements missed within a measurement period and during inactive periods of a cell DTX pattern, and may perform an adjusted mobility event detection procedure based at least in part on a quantity of L3 mobility measurements missed within the measurement period satisfying the threshold. Accordingly, the UE may account for missed L3 mobility measurement during cell DTX, thereby improving reliability of mobility event detection and, therefore, reducing the likelihood of ping-pongs (e.g., back-and-forth handovers between a same pair of cells) or call drops.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a configuration indicating a threshold for L3 measurements missed within a measurement period and during inactive periods of a cell DTX pattern, and perform an adjusted mobility event detection procedure based at least in part on a quantity of L3 mobility measurements missed within the measurement period satisfying the threshold.

As described in more detail elsewhere herein, the communication manager 140 may in some aspects, receive a configuration indicating that an inactive period of a cell DTX pattern is to be ignored, and perform a mobility event detection procedure based at least in part on the configuration indicating that the inactive period of the cell DTX pattern is to be ignored.

As described in more detail elsewhere herein, the communication manager 140 may in some aspects, receive a configuration for a signal to be received during an active period of a cell DTX pattern, receive the signal during the active period of the cell DTX pattern based at least in part on the configuration, and perform a mobility event detection procedure based at least in part on an L3 measurement associated with the signal received during the active period of the DTX pattern.

As described in more detail elsewhere herein, the communication manager 140 may in some aspects receive a configuration indicating that a signal is to be received during an inactive period of a cell DTX pattern, receive the signal during the inactive period of the cell DTX pattern based at least in part on the configuration, and perform a mobility event detection procedure based at least in part on an L3 measurement associated with the signal received during the inactive period of the cell DTX pattern.

Additionally, or alternatively, the communication manager 140 may perform one or more other operations described herein.

As indicated above, FIG. 1 is provided as an example. Other examples may differ from what is described with regard to FIG. 1.

Figure 2:
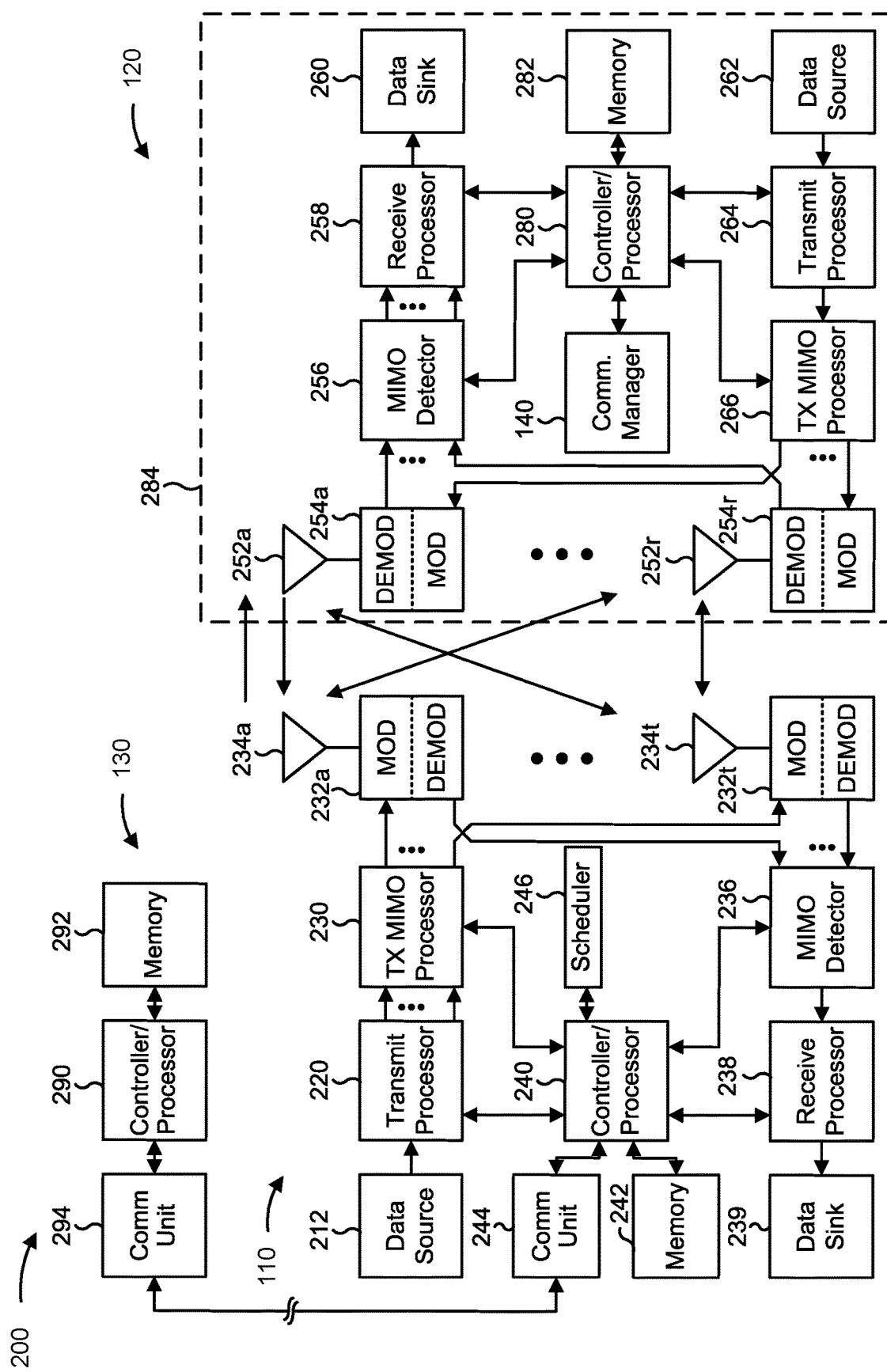
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with L3 mobility measurement during cell DTX, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a configuration indicating a threshold for L3 measurements missed within a measurement period and during inactive periods of a cell DTX pattern; and/or means for performing an adjusted mobility event detection procedure based at least in part on a quantity of L3 mobility measurements missed within the measurement period satisfying the threshold.

In some aspects, the UE 120 includes means for receiving a configuration indicating that an inactive period of a cell DTX pattern is to be ignored; and/or means for performing a mobility event detection procedure based at least in part on the configuration indicating that the inactive period of the cell DTX pattern is to be ignored.

In some aspects, the UE 120 includes means for receiving a configuration for a signal to be received during an active period of a cell DTX pattern; means for receiving the signal during the active period of the cell DTX pattern based at least in part on the configuration; and/or means for performing a mobility event detection procedure based at least in part on an L3 measurement associated with the signal received during the active period of the DTX pattern.

In some aspects, the UE 120 includes means for receiving a configuration indicating that a signal is to be received during an inactive period of a cell DTX pattern; means for receiving the signal during the inactive period of the cell DTX pattern based at least in part on the configuration; and/or means for performing a mobility event detection procedure based at least in part on an L3 measurement associated with the signal received during the inactive period of the cell DTX pattern.

The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIGS. 3A and 3B are diagrams illustrating examples 300 and 310, respectively, associated with cell DTX. A network node 110 configured for cell DTX has the opportunity to be inactive during, for example, periods of time during which the network node 110 has no data to transmit to any UEs 120 in a given cell.

In example 300, the network node 110 utilizes a periodic cell DTX pattern 302. In this example, each pattern 302 comprises an active period 304 and an inactive period 306. An active period 304 is a period of time during which the network node 110 is in an active state such that the network node 110 may transmit downlink communications or other channels or signals on the cell. The network node 110 may not enter a sleep mode during the active period 304. An inactive period 306 is a period of time during which the network node 110 is in an inactive state such that the network node 110 does not transmit any downlink communications on the cell. During an inactive period 306, the network node 110 may refrain from transmitting or receiving one or more periodic signals or channels in the cell, such as one or more UE-common signals or channels, one or more UE-specific signals or channels, or the like. Further, during an inactive period 306, the network node 110 may have no transmission or reception in the cell or, alternatively, may have limited transmission or reception in the cell. In some scenarios, the network node 110 may enter the sleep mode during the inactive period 306. In example 300, the network node 110 may indicate the pattern 302 to a UE 120 in the associated cell (e.g., such that the UE 120 has knowledge of the inactive periods 306). However, the network node 110 does not need to separately indicate each inactive period 306 to the UE 120, thereby reducing signaling overhead associated with implementing cell DTX.

In example 310, the network node 110 utilizes dynamically triggered cell DTX (e.g., such that the cell DTX has an irregular or undefined pattern). In this example, the network node 110 transmits a trigger 308 (e.g., in downlink control information (DCI)) to indicate an upcoming inactive period 306 to a UE 120 in the cell. The trigger 308 may include one or more other items of information, such as a length of the upcoming inactive period 306. Dynamically triggered cell DTX improves flexibility of implementation of cell DTX. In practice, cell DTX (e.g., cell DTX that uses periodic patterns or dynamic triggers) can significantly reduce energy consumed by the network node 110.

With respect to cell DTX, a network node 110 can enter inactive modes at different time granularities. For example, connected mode discontinuous reception (C-DRX) is configured per UE 120 and, therefore, an inactive period 306 that would align with a DRX inactive time for a first UE 120 may overlap with a DRX active time for a second UE 120 (depending on a scheduler of the network node 110). In such a case, the network node 110 would need to schedule the different UEs 120 on different time periods and, therefore, an amount of time left for cell inactivity may be limited. In some systems, UE C-DRX can be used in conjunction with cell DTX such that UE DRX cycles or offsets configured for multiple UEs 120 are aligned with one another. As a result, longer inactive periods 306 can be enabled at the network node 110, as well as reduced activity of the network node 110 outside of UE DRX active times (e.g., reduced synchronization signal block (SSB) transmissions, reduced configured grant (CG) physical uplink shared channel (PUSCH) transmissions, reduced random access channel (RACH) transmissions, or the like). Alignment of UE DRX cycles can be performed via, for example, radio resource control (RRC) reconfiguration. Further, since a UE 120 may be configured to monitor certain particular signals or channels from the network node 110 outside of a UE DRX active time, there may be a corresponding restriction to network node 110 inactivity time for cell DTX.

As indicated above, FIGS. 3A and 3B are provided as examples. Other examples may differ from what is described with regard to FIGS. 3A and 3B.

In some wireless communication systems, UE mobility can be managed at L3 (i.e., a radio resource control (RRC)

layer). Such mobility is referred to as L3 mobility. According to one example of an L3 mobility procedure, a serving cell of a UE 120 may be changed using L3 configurations or signaling. More particularly, a UE 120 may change a serving cell (sometimes referred to as a special cell (SpCell)) from a first cell (e.g., Cell 1) associated with a first network node 110a to a second cell (e.g., Cell 2) associated with a second network node 110b when, for example, the UE 120 moves away from a coverage area provided by the first cell and into a coverage area provided by the second cell. In such a scenario, the first network node 110a or the second network node 110b may utilize L3 configurations or signaling to perform a handover of the UE 120 from the first cell to the second cell. The handover may be performed when, for example, the second cell becomes a stronger cell than the first cell or when the second cell becomes a better candidate to serve as the serving cell (e.g., SpCell) for the UE 120.

In general, with respect to L3 mobility, the UE 120 performs one or more L3 mobility measurements associated with the first cell or the second cell. For example, the UE 120 may measure one or more signals transmitted on the first cell or one or more signals transmitted on the second cell. The one or more signals may include, for example, one or more SSBs or one or more CSI-RSs. The L3 mobility measurements may include, for example, an RSRP measurement, an RSRQ measurement, an RSSI measurement, or a signal-to-interference-plus-noise ratio (SINR) measurement, among other examples. The UE 120 may then determine whether a triggering event has occurred (e.g., whether a handover condition is satisfied) based on the L3 mobility measurements and, further, may provide a measurement report including information associated with the L3 mobility measurements to the first network node 110a. The first network node 110a may use the measurement report to determine whether to trigger a handover of the UE 120 to the second network node 110b. For example, if one or more measurements satisfy a condition, then the first network node 110a may trigger and perform a handover of the UE 120 to the second network node 110b via RRC signaling.

In general, a network node 110, such as the first network node 110a, may provide the UE 120 with one or more configurations associated with performing the L3 mobility measurements, reporting information associated with the L3 mobility measurements, or detecting a mobility event. For example, the network node 110 may provide the UE 120 with a measurement configuration that indicates a configuration associated with the signal to be measured (e.g., ssb-ConfigMobility, CSI-RS-ResourceConfigMobility, or the like). The measurement configuration can be provided, for example, via RRC signaling (e.g., RRCReconfiguration→measConfig→MeasObjectToAddModList→MeasObjectNR→ReferenceSignalConfig). As another example, the network node 110 may provide the UE 120 with a reporting configuration that indicates a configuration associated with L3 mobility measurement reporting. The reporting configuration can be provided, for example, via RRC signaling (e.g., RRCReconfiguration→measConfig→VarMeasConfig→ReportConfigToAddModList→ReportConfigNR). In some cases, the UE 120 may be configured to perform L3 filtering in association with performing the one or more L3 mobility measurements, meaning that a L3 mobility measurement at a given slot can depend on M (M≥1) previous measurements.

With respect to performing L3 mobility measurements, the UE 120 should obtain at least one measurement sample within a given measurement period. Within a given measurement period, there might be one or more occasions during which the UE 120 can obtain at least one sample from a signal (e.g., SSB, CSI-RS, or the like) that is to be measured by the UE 120. In practice, the measurement sample(s) taken by the UE 120 within a given measurement period may be selected or determined by the UE 120 120.

However, cell DTX can impact L3 mobility measurements by the UE 120. For example, the network node 110 may not transmit a signal that the UE 120 is configured to use for performing an L3 mobility measurement during an inactive period 306 associated with cell DTX, meaning that the UE 120 may miss one or more L3 mobility measurements.

Figure 4:
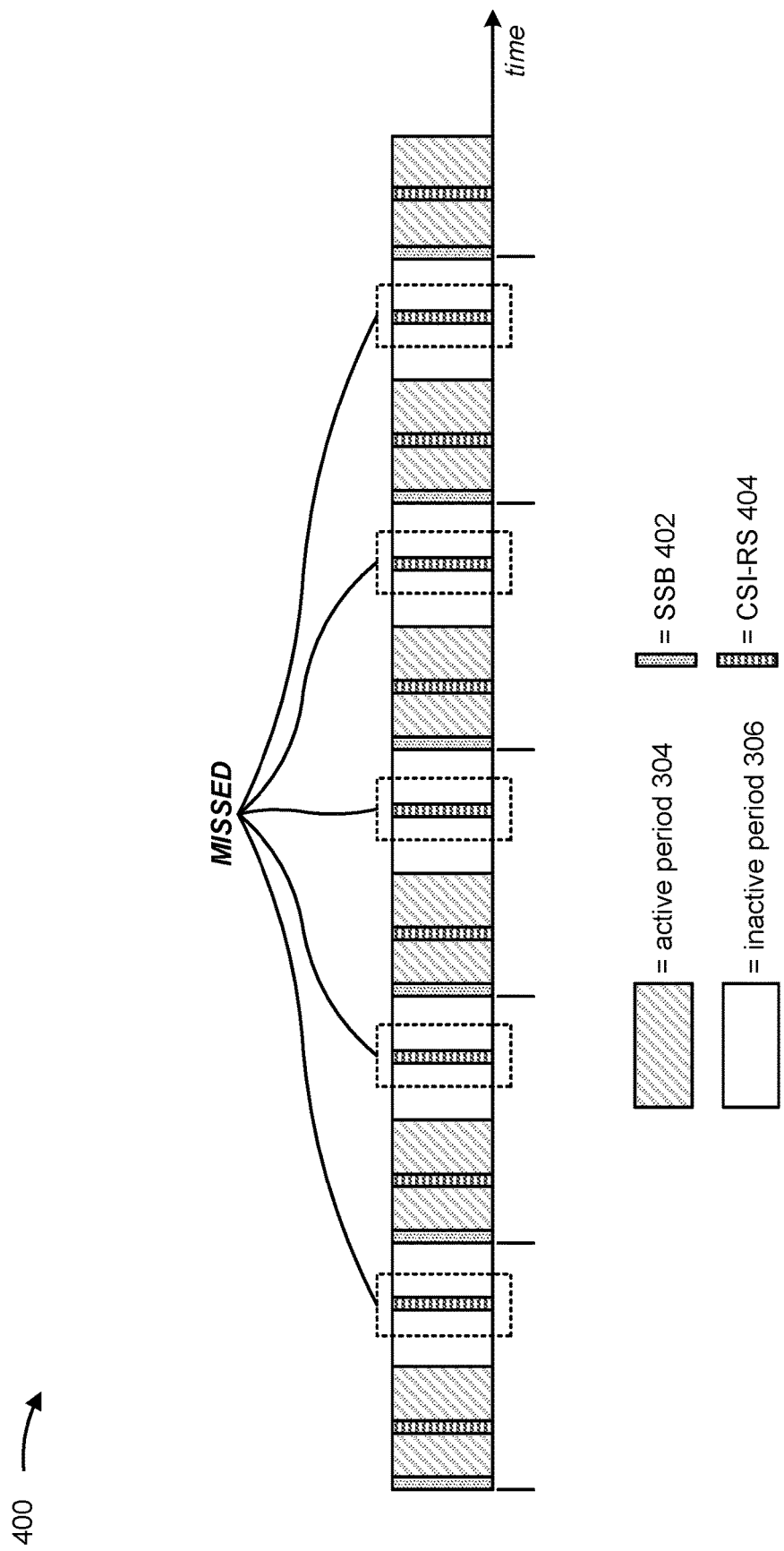
FIG. 4 is a diagram illustrating an example illustrating layer 3 (L3) mobility measurements missed by a UE as a result of cell DTX.

FIG. 4 is a diagram illustrating an example 400 illustrating L3 mobility measurements missed by a UE 120 as a result of cell DTX. In the example shown in FIG. 4, the UE 120 is configured to perform L3 mobility measurements based on CSI-RS transmitted by the network node 110. SSB resources 402 and CSI-resource sets 404 overlapping with active periods 304 and inactive periods 306 are shown in FIG. 4. However, as illustrated in FIG. 4, multiple CSI-RS resources 404 may fall within inactive periods 306 of the network node 110, and so the network node 110 does not transmit CSI-RS at multiple CSI-RS resources. As a result, the UE 120 misses multiple L3 mobility measurements during the inactive periods 306. Here, mobility event detection may be negatively impacted due to the missed measurements. For example, a quantity of CSI-RS samples that can be obtained by the UE 120 during the measurement period is reduced, which reduces reliability of one or more L3 mobility measurements and, therefore, reduces reliability of mobility event detection performed using the one or more L3 mobility measurements. For example, the missed L3 mobility measurements may cause a result of L3 averaging performed by the UE 120 to misrepresent an actual signal strength of the CSI-RS, which can result in a failure to detect a mobility event or an erroneous detection of a mobility event.

As another example, as noted above, measurement sample(s) taken by the UE 120 within a given measurement period may in some cases be selected or determined by the UE 120. For example, for a measurement period of 400 milliseconds (ms) in frequency range 2 (FR2), the UE 120 can obtain any measurement within a measurement period, so if there are 20 opportunities for measurement and 10 of these measurement opportunities are no longer available due to cell DTX, then, the UE 120 can measure on 10 measurement samples. However, this may still result in non-optimal mobility performance (e.g., ping-pongs, call drops, or the like). For example, the UE 120 may perform five or fewer measurements within the measurement period due to selection by the UE 120. In such a case, a result of mobility event detection by the UE 120 based on the small number of samples collected may be incorrect when used with previous measurement samples due to an L3 filter being configured to operate with 20 samples every 400 ms. In this example, the "memory" of the L3 filter could span four measurement periods, and there are only five samples per measurement period. This might result in, for example, an erroneous handover decision, which could result in ping-pongs or call drops.

Some techniques and apparatuses described herein enable enhanced L3 mobility measurement during cell DTX. In some aspects, a UE 120 may receive a configuration indicating a threshold for L3 measurements missed within a measurement period and during inactive periods of a cell DTX pattern. In some aspects, the UE 120 may perform an adjusted mobility event detection procedure based at least in part on a quantity of L3 mobility measurements missed within the measurement period satisfying the threshold.

In some aspects, the techniques and apparatuses described herein enable improved L3 mobility measurement during cell DTX. For example, the techniques and apparatuses described herein enable mobility event detection performed by the UE 120 to be adjusted to account for missed L3 mobility measurements (e.g., L3 mobility measurements missed due to cell DTX) or to reduce an impact of the missed L3 mobility measurements. As a result, reliability of mobility event detection as performed by the UE 120 may be improved, thereby reducing the likelihood of, for example, ping-pongs or call drops. Additional details and example aspects are provided in further detail below.

Figure 5:
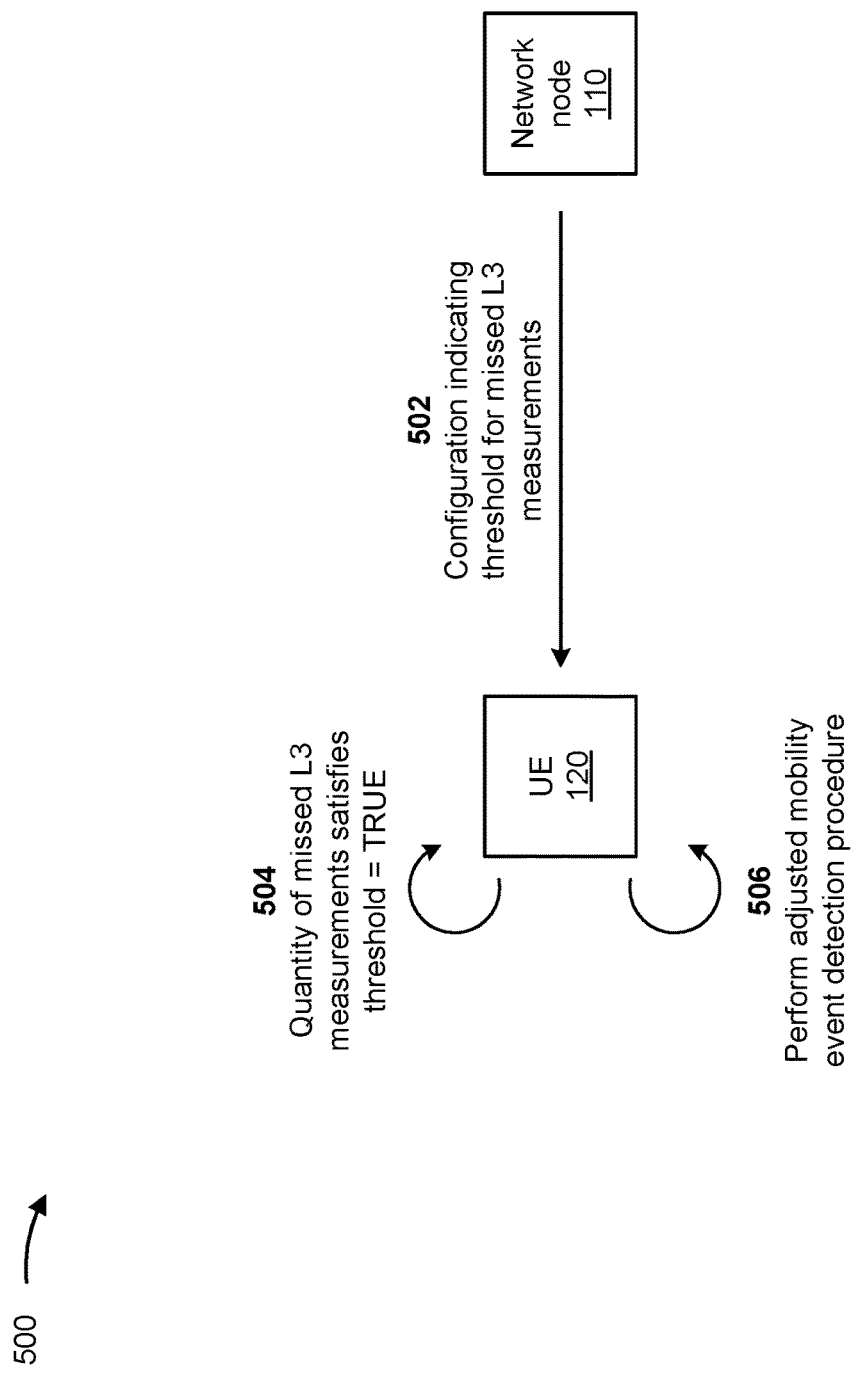
FIG. 5 is a diagram illustrating an example associated with enhanced L3 mobility measurement during cell DTX.

FIG. 5 is a diagram illustrating an example 500 associated with L3 mobility measurement during cell DTX. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown at reference 502, the UE 120 may receive a configuration (e.g., information indication a configuration) indicating a threshold for L3 measurements missed within a measurement period and during inactive periods of a cell DTX pattern. For example, the threshold may indicate a maximum percentage of L3 mobility measurements that can be missed with a measurement period. As another example, the threshold may indicate a maximum quantity of L3 mobility measurements that can be missed within a measurement period. In some aspects, the UE 120 may utilize the configured threshold in association with determining whether to perform an adjusted mobility event detection procedure, as described in further detail below. In some aspects, the configuration may indicate the cell DTX pattern. That is, the configuration may in some aspects indicate the cell DTX pattern to be applied by the network node 110. In this way, the UE 120 may be informed of the cell DTX pattern, which enables the UE 120 to identify one or more L3 mobility measurements that would be missed by the UE 120 within a measurement period as a result of cell DTX, and thereby facilitates the determination of whether a quantity of L3 mobility measurements missed within the measurement period satisfies the threshold, as described with respect to reference 504.

In some aspects, as illustrated in example 500, the UE 120 may receive the configuration from the network node 110. In some aspects, the UE 120 may receive the configuration via DCI. Additionally, or alternatively, the UE 120 may receive the configuration via a medium access control (MAC) control element. Additionally, or alternatively, the UE 120 may receive the configuration via RRC signaling (e.g., via ReportConfigNR).

As shown at reference 504, the UE 120 may determine that a quantity of L3 mobility measurements missed within a measurement period satisfies the threshold. For example, the UE 120 may be configured with a measurement configuration indicating one or more signals (e.g., SSBs, CSI-RS, or the like) based on which the UE 120 is to perform L3 mobility measurements. The measurement configuration (or a reporting configuration) may further indicate a measurement period during which the UE 120 is to obtain L3 mobility measurements. The UE 120 may then attempt to sample the signal during the measurement period in association with performing one or more L3 mobility measurements. Here, the UE 120 counts a quantity of L3 mobility measurements missed during the measurement period. In some aspects, the UE 120 may miss an L3 mobility measurement due to, for example, cell DTX (e.g., when a measurement opportunity falls within an inactive period). Additionally, or alternatively, the UE 120 may miss an L3 mobility measurement as a result of a selection by the UE 120 (e.g., when measurement samples taken by the UE 120 are selected or determined by the UE 120). The UE 120 may then determine whether the quantity of L3 mobility measurements missed within the measurement period satisfies the threshold.

In some aspects, the UE 120 may determine that the quantity of L3 mobility measurements missed within the measurement period does not satisfy the threshold (e.g., that a quantity of missed L3 mobility measurements results in a percentage of missed L3 mobility measurements being less than or equal to a threshold percentage, or that a quantity of missed L3 mobility measurements is less than or equal to a threshold quantity). In such a case, the UE 120 may perform a mobility detection procedure in a conventional manner (i.e., without adjustment for missed L3 mobility measurements).

Alternatively, the UE 120 may determine that the quantity of L3 mobility measurements missed within the measurement period satisfies the threshold (e.g., that the quantity of missed L3 mobility measurements results in a percentage of missed L3 mobility measurements being greater than the threshold percentage, or that the quantity of missed L3 mobility measurements is less than or equal to the threshold quantity). In such a case, the UE 120 may perform an adjusted mobility detection procedure, as described with respect to reference 506.

In some aspects, the one or more signals based on which the UE 120 performs L3 mobility measurements may include a CSI-RS. Thus, in some aspects, the L3 mobility measurements missed within the measurement period may include one or more missed CSI-RS measurements. Additionally, or alternatively, the one or more signals based on which the UE 120 performs L3 mobility measurements may include an SSB. Thus, in some aspects, the L3 mobility measurements missed within the measurement period include one or more missed SSB measurements.

As shown at reference 506, the UE 120 may perform an adjusted mobility event detection procedure based at least in part on the quantity of L3 mobility measurements missed within the measurement period satisfying the threshold. In some aspects, the adjusted mobility event detection procedure is a mobility detection procedure that is performed to (at least partially) account for one or more L3 mobility measurements missed during the measurement period or to reduce an impact of the missed L3 mobility measurements on a procedure used to detect a mobility event. In some aspects, the adjusted mobility event detection procedure is associated with detecting a handover event during operation of the UE 120 in a connected mode (e.g., the mobility event may be a handover event (event A3) during connected mode operation of the UE 120). In some aspects, the adjusted mobility event detection procedure may be associated with detecting a cell reselection event during operation of the UE 120 in an idle mode or in an inactive mode.

In some aspects, performing the adjusted mobility event detection procedure includes applying one or more adjusted parameter values in association with detecting a mobility event. In some aspects, applying one or more adjusted parameter values enables the mobility event detection procedure to be adjusted so as to account for missed L3 mobility measurements or to otherwise reduce an impact of the missed L3 mobility measurements on the mobility event detection procedure. Thus, application of the one or more adjusted parameter values can increase reliability of mobility event detection as performed by the UE 120 and, as a result, reduce the likelihood of, for example, ping-pongs or call drops. In some aspects, the configuration indicating the threshold may include information indicating the one or more adjusted parameter values. For example, the (adjusted) mobility event detection procedure may be a procedure based at least in part on which the UE 120 is to detect a handover event. In such a case, the one or more adjusted parameter values may include, for example, an adjusted hysteresis value or an adjusted time-to-trigger value. Here, the adjusted hysteresis value may be a hysteresis value that differs from a hysteresis value to be applied when the quantity of L3 mobility measurements missed during the measurement period does not satisfy the threshold. Similarly, the adjusted time-to-trigger value may be a time-to-trigger value that differs from a time-to-trigger value to be applied when the quantity of L3 mobility measurements missed during the measurement period does not satisfy the threshold.

In some aspects, the one or more adjusted parameter values may be configured so as to favor detection of the mobility event (e.g., such that a handover or cell reselection to a cell applying cell DTX is favored, which can be achieved by decreasing the hysteresis value or the time-to-trigger value). Alternatively, the one or more adjusted parameter values can, in some aspects, be configured so as to disfavor detection of the mobility event (e.g., such that a handover or cell reselection to a cell applying cell DTX is disfavored, which can be achieved by increasing the hysteresis value or the time-to-trigger value).

In some aspects, performing the adjusted mobility event detection procedure includes using a valid (i.e., non-missed) L3 mobility measurement in place of a missed L3 mobility measurement in association with detecting a mobility event. That is, in some aspects, the UE 120 may use a previously obtained L3 mobility measurement in place of a missed L3 mobility measurement. In some aspects, a valid L3 mobility measurement used by the UE 120 in place of a particular missed L3 mobility measurement is a last valid L3 mobility measurement obtained prior to the missed L3 mobility measurement. For example, with reference to FIG. 4, the UE 120 may use the CSI-RS-based L3 mobility measurement obtained during the first active period 304 in place of the CSI-RS-based L3 mobility measurement missed in the first inactive period 306, may use the CSI-RS-based L3 mobility measurement obtained during the second active period 304 in place of the CSI-RS-based L3 mobility measurement missed during the second inactive period 306, and so on. In some aspects, use of a valid L3 mobility measurement in this manner enables the mobility event detection procedure to be adjusted so as to at least partially account for missed L3 mobility measurements. For example, a valid L3 mobility measurement may be reasonably assumed to be representative of a missed L3 mobility measurement that is near the valid L3 mobility measurement in the time domain and, therefore, can at least partially account for the missed L3 mobility measurement and increase reliability of mobility event detection by the UE 120.

In some aspects, an indication associated with the adjusted mobility event detection procedure (e.g., an indication of whether the UE 120 is to use adjusted parameter values or is to use valid L3 mobility measurements in place of missed L3 mobility measurements) can be indicated to the UE 120 via DCI, a MAC CE, or RRC signaling (e.g., MeasObjectNR). In some aspects, the indication associated with the adjusted mobility event detection procedure can be included in the configuration that indicates the threshold.

In this way, mobility event detection performed by the UE 120 can be adjusted so as to account for missed L3 mobility measurements (e.g., due to cell DTX) or to reduce an impact of the missed L3 mobility measurements. As a result, reliability of mobility event detection as performed by the UE 120 may be improved, thereby reducing the likelihood of, for example, ping-pongs or call drops.

As indicated above, FIG. 5 is provided as an example. Other examples may differ from what is described with respect to FIG. 5.

In another aspect, L3 mobility measurement during cell DTX can be adjusted so as to cause the UE 120 to ignore inactive periods of cell DTX. For example, the UE 120 may in some aspects receive a configuration indicating that an inactive period of a cell DTX pattern is to be ignored. Here, the UE 120 may perform a mobility event detection procedure based at least in part on the configuration indicating that the inactive period of the cell DTX pattern is to be ignored. That is, the UE 120 may be configured to ignore the cell DTX inactive periods and may perform the mobility event detection procedure irrespective of any missed L3 mobility measurements. In some aspects, ignoring the inactive periods of the cell DTX reduces complexity at the UE 120 (e.g., as compared to adjusting the mobility event detection procedure) and, therefore, can simplify UE operation and reduce consumption of resources (e.g., processing resources, battery power, or the like) at the UE 120.

In another aspect, the network node 110 can configure the measurement signal (e.g., CSI-RS, SSB, or the like) for mobility on the same active slot(s) for all active UEs 120 (e.g., so that resources on which the signal is to be transmitted do not fall within inactive periods). Thus, in some aspects, the UE 120 may receive a configuration for a signal to be received during an active period of a cell DTX pattern. Here, the UE 120 may receive the signal during the active period of the cell DTX pattern based at least in part on the configuration, and may perform a mobility event detection procedure based at least in part on an L3 measurement associated with the signal received during the active period of the DTX pattern. In this way, the measurement signal can be configured such that a UE 120 does not miss L3 mobility measurements within a given measurement period, thereby preventing a decrease in reliability of mobility event detection as performed by the UE 120 that could otherwise result due to one or more L3 mobility measurements being missed by the UE 120.

In another aspect, the network node 110 may be configured such that the network node 110 wakes during an inactive period in order to transmit the signal (e.g., CSI-RS, SSB, or the like) to the UE 120 for L3 mobility measurements. In such an aspect, the network node 110 may indicate (e.g., along with the cell DTX pattern) that the network node 110 is to wake and transmit the signal during the inactive period. Thus, in some aspects, the UE 120 may receive a configuration indicating that a signal is to be received during an inactive period of a cell DTX pattern. Here, the UE 120 may receive the signal during the inactive period of the cell DTX pattern based at least in part on the configuration, and may perform a mobility event detection procedure based at least in part on an L3 measurement associated with the signal received during the inactive period of the cell DTX pattern. In this way, the network node 110 may be configured to wake to transmit the signal during the inactive, and may inform a UE 120 accordingly, such that the UE 120 does not missed L3 mobility measurements within a given measurement period, thereby preventing a decrease in reliability of mobility event detection as performed by the UE 120 that could otherwise result due to one or more L3 mobility measurements being missed by the UE 120.

Figure 6:
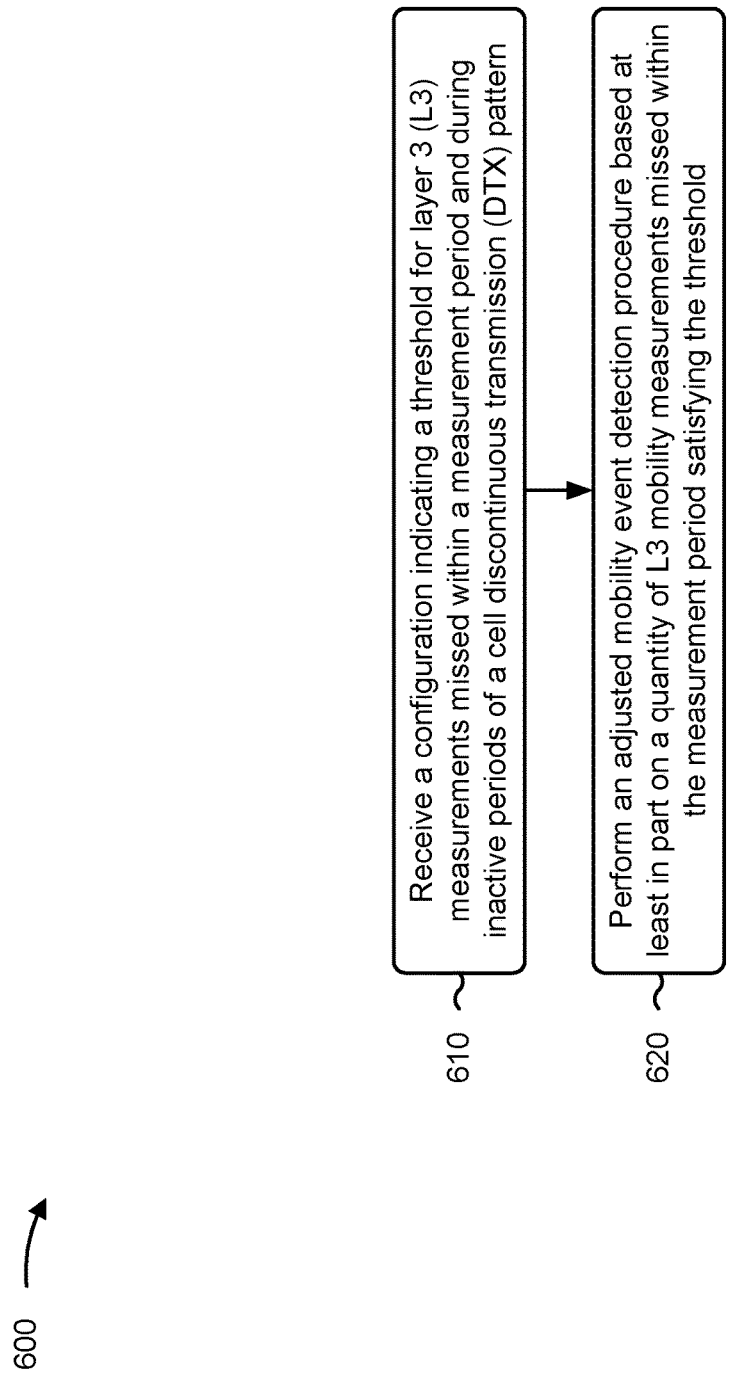
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for layer 3 mobility measurement during cell DTX.

As shown in FIG. 6, in some aspects, process 600 may include receiving a configuration indicating a threshold for L3 measurements missed within a measurement period and during inactive periods of a cell DTX pattern (block 610). For example, the UE (e.g., using reception component 1002 and/or communication manager 1006, depicted in FIG. 10) may receive a configuration indicating a threshold for L3 measurements missed within a measurement period and during inactive periods of a cell DTX pattern, as described above.

As further shown in FIG. 6, in some aspects, process 600 may include performing an adjusted mobility event detection procedure based at least in part on a quantity of L3 mobility measurements missed within the measurement period satisfying the threshold (block 620). For example, the UE (e.g., using communication manager 1006, depicted in FIG. 10) may perform an adjusted mobility event detection procedure based at least in part on a quantity of L3 mobility measurements missed within the measurement period satisfying the threshold, as described above.

Process 600 may include additional aspects, such as any single aspect or any combination of aspects described below and/or in connection with one or more other processes described elsewhere herein.

In a first aspect, performing the adjusted mobility event detection procedure comprises applying one or more adjusted parameter values in association with detecting a mobility event.

In a second aspect, alone or in combination with the first aspect, the configuration indicates the one or more adjusted parameter values.

In a third aspect, alone or in combination with one or more of the first and second aspects, the one or more adjusted parameter values include at least one of an adjusted hysteresis value or an adjusted time-to-trigger value.

In a fourth aspect, alone or in combination with one or more of the first through third aspects, performing the adjusted mobility event detection procedure comprises using a valid L3 mobility measurement in place of a missed L3 mobility measurement in association with detecting a mobility event.

In a fifth aspect, alone or in combination with one or more of the first through fourth aspects, the valid L3 mobility measurement is a last valid L3 mobility measurement prior to the missed L3 mobility measurement.

In a sixth aspect, alone or in combination with one or more of the first through fifth aspects, the configuration indicates the cell DTX pattern.

In a seventh aspect, alone or in combination with one or more of the first through sixth aspects, the configuration is received via at least one of DCI, a MAC control element, or RRC signaling.

In an eighth aspect, alone or in combination with one or more of the first through seventh aspects, the L3 mobility measurements missed within the measurement period comprise one or more missed CSI-RS measurements.

In a ninth aspect, alone or in combination with one or more of the first through eighth aspects, the L3 mobility measurements missed within the measurement period comprise one or more missed SSB measurements.

In a tenth aspect, alone or in combination with one or more of the first through ninth aspects, the adjusted mobility event detection procedure is associated with detecting a handover event during operation of the UE in a connected mode.

In an eleventh aspect, alone or in combination with one or more of the first through tenth aspects, the adjusted mobility event detection procedure is associated with detecting a cell reselection event during operation of the UE in an idle mode or in an inactive mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
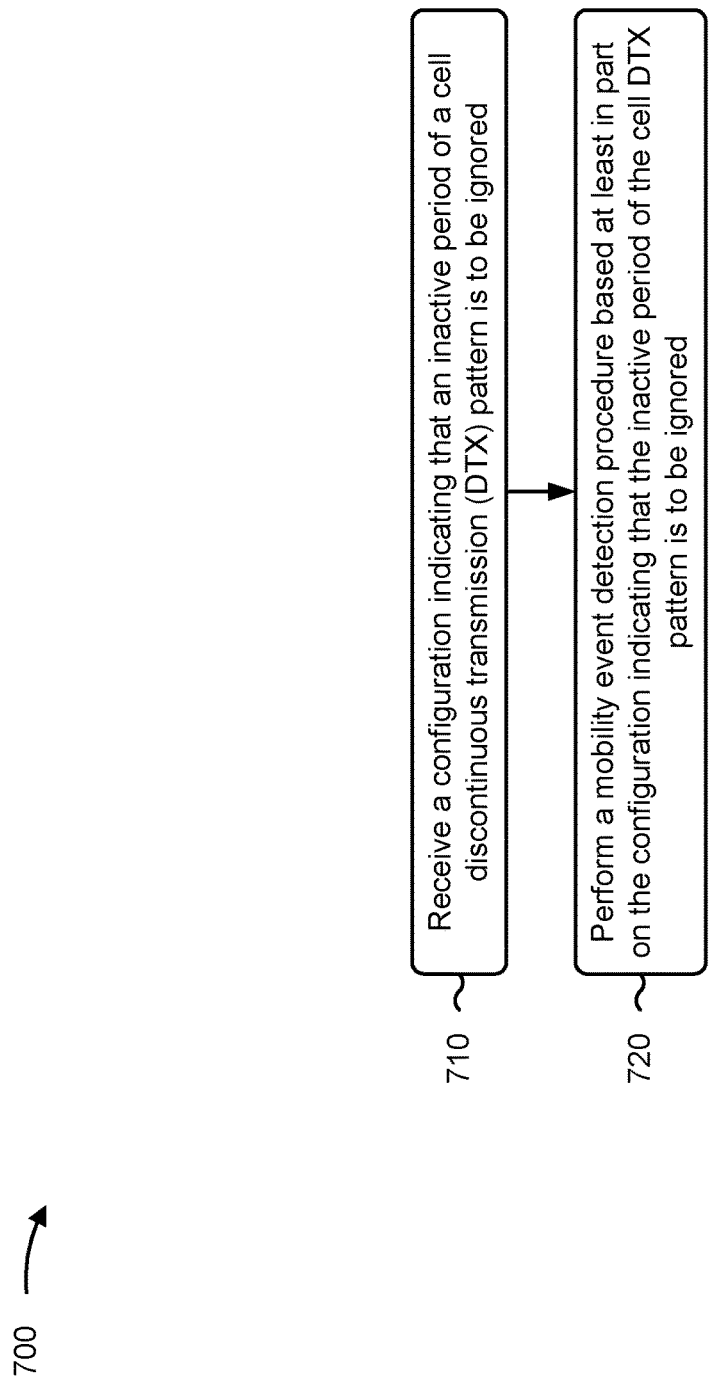
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for layer 3 mobility measurement during cell DTX.

As shown in FIG. 7, in some aspects, process 700 may include receiving a configuration indicating that an inactive period of a cell DTX pattern is to be ignored (block 710). For example, the UE (e.g., using reception component 1002 and/or communication manager 1006, depicted in FIG. 10) may receive a configuration indicating that an inactive period of a cell DTX pattern is to be ignored, as described above.

As further shown in FIG. 7, in some aspects, process 700 may include performing a mobility event detection procedure based at least in part on the configuration indicating that the inactive period of the cell DTX pattern is to be ignored (block 720). For example, the UE (e.g., using communication manager 1006, depicted in FIG. 10) may perform a mobility event detection procedure based at least in part on the configuration indicating that the inactive period of the cell DTX pattern is to be ignored, as described above.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
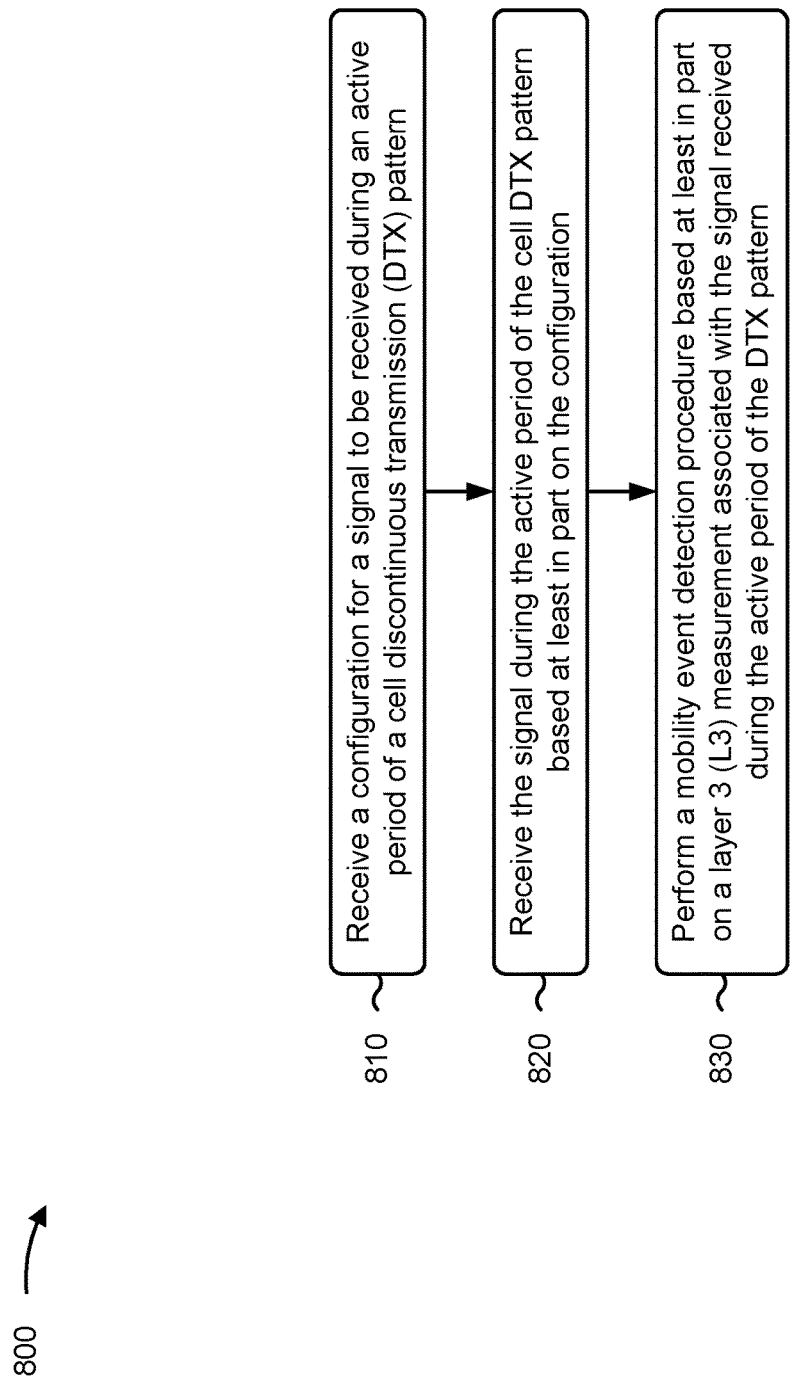
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for layer 3 mobility measurement during cell DTX.

As shown in FIG. 8, in some aspects, process 800 may include receiving a configuration for a signal to be received during an active period of a cell DTX pattern (block 810). For example, the UE (e.g., using reception component 1002 and/or communication manager 1006, depicted in FIG. 10)

may receive a configuration for a signal to be received during an active period of a cell DTX pattern, as described above.

As further shown in FIG. 8, in some aspects, process 800 may include receiving the signal during the active period of the cell DTX pattern based at least in part on the configuration (block 820). For example, the UE (e.g., using reception component 1002 and/or communication manager 1006, depicted in FIG. 10) may receive the signal during the active period of the cell DTX pattern based at least in part on the configuration, as described above.

As further shown in FIG. 8, in some aspects, process 800 may include performing a mobility event detection procedure based at least in part on an L3 measurement associated with the signal received during the active period of the DTX pattern (block 830). For example, the UE (e.g., using communication manager 1006, depicted in FIG. 10) may perform a mobility event detection procedure based at least in part on an L3 measurement associated with the signal received during the active period of the DTX pattern, as described above.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
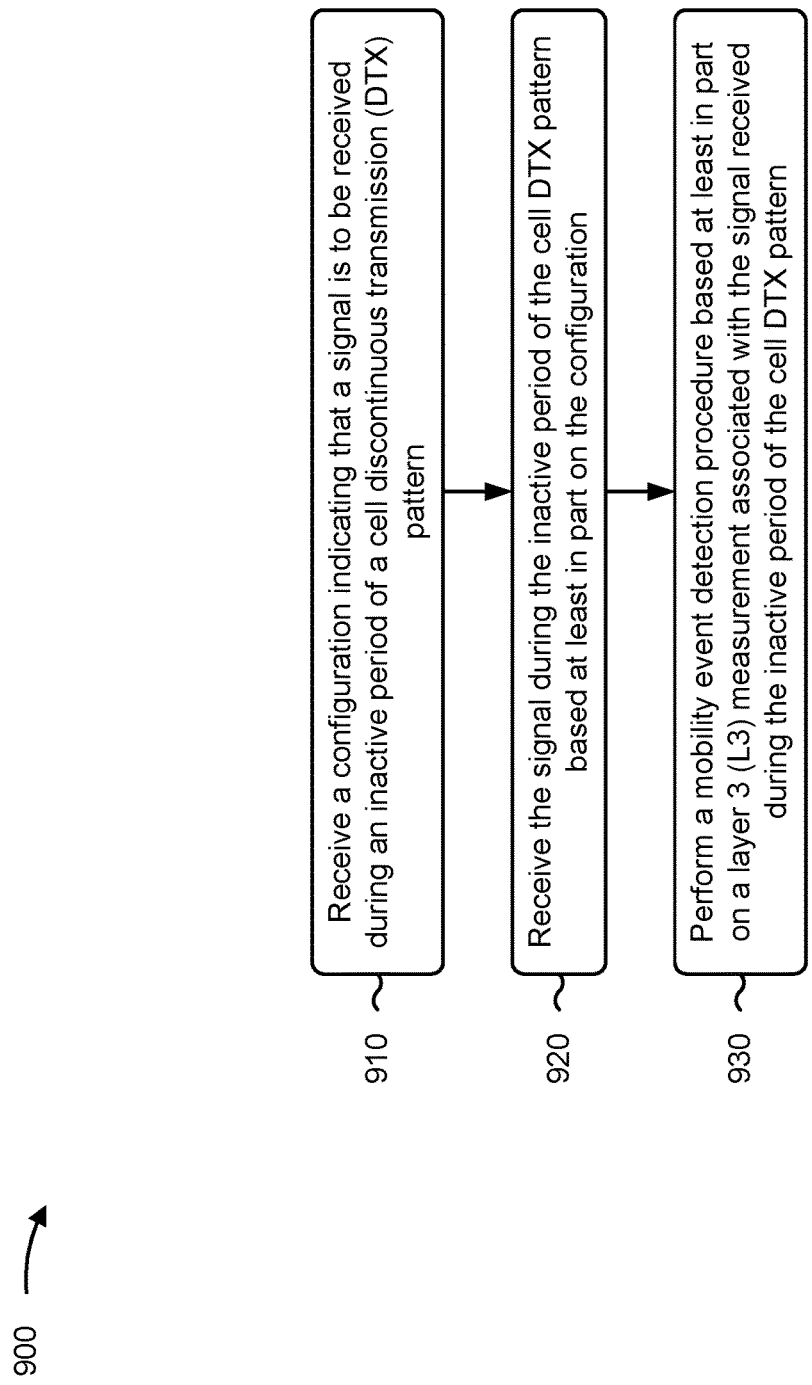
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with techniques for layer 3 mobility measurement during cell DTX.

As shown in FIG. 9, in some aspects, process 900 may include receiving a configuration indicating that a signal is to be received during an inactive period of a cell DTX pattern (block 910). For example, the UE (e.g., using reception component 1002 and/or communication manager 1006, depicted in FIG. 10) may receive a configuration indicating that a signal is to be received during an inactive period of a cell DTX pattern, as described above.

As further shown in FIG. 9, in some aspects, process 900 may include receiving the signal during the inactive period of the cell DTX pattern based at least in part on the configuration (block 920). For example, the UE (e.g., using reception component 1002 and/or communication manager 1006, depicted in FIG. 10) may receive the signal during the inactive period of the cell DTX pattern based at least in part on the configuration, as described above.

As further shown in FIG. 9, in some aspects, process 900 may include performing a mobility event detection procedure based at least in part on an L3 measurement associated with the signal received during the inactive period of the cell DTX pattern (block 930). For example, the UE (e.g., using communication manager 1006, depicted in FIG. 10) may perform a mobility event detection procedure based at least in part on an L3 measurement associated with the signal received during the inactive period of the cell DTX pattern, as described above.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
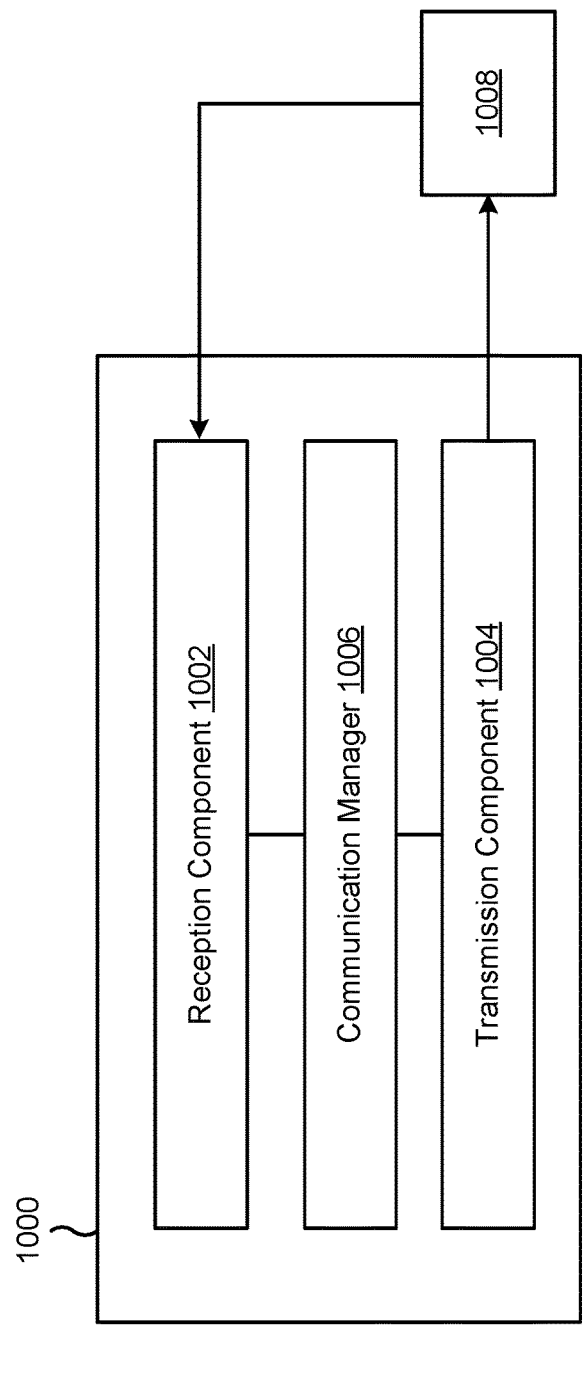
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 5. Additionally, or alternatively, the apparatus 1000 may be configured to perform one or more processes described herein, such as process 600 of FIG. 6, process 700 of FIG. 7, process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may 1006 may generate and/or provide control information to the reception component 1002 and/or the transmission component 1004 to control reception and/or transmission of communications.

The reception component 1002 may receive a configuration indicating a threshold for L3 measurements missed within a measurement period and during inactive periods of a cell DTX pattern. The communication manager 1006 may perform an adjusted mobility event detection procedure based at least in part on a quantity of L3 mobility measurements missed within the measurement period satisfying the threshold.

The reception component 1002 may receive a configuration indicating that an inactive period of a cell DTX pattern is to be ignored. The communication manager 1006 may perform a mobility event detection procedure based at least in part on the configuration indicating that the inactive period of the cell DTX pattern is to be ignored.

The reception component 1002 may receive a configuration for a signal to be received during an active period of a cell DTX pattern. The reception component 1002 may receive the signal during the active period of the cell DTX pattern based at least in part on the configuration. The communication manager 1006 may perform a mobility event detection procedure based at least in part on an L3 measurement associated with the signal received during the active period of the DTX pattern.

The reception component 1002 may receive a configuration indicating that a signal is to be received during an inactive period of a cell DTX pattern. The reception component 1002 may receive the signal during the inactive period of the cell DTX pattern based at least in part on the configuration. The communication manager 1006 may perform a mobility event detection procedure based at least in part on an L3 measurement associated with the signal received during the inactive period of the cell DTX pattern.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving a configuration indicating a threshold for L3 measurements missed within a measurement period and during inactive periods of a cell DTX pattern; and performing an adjusted mobility event detection procedure based at least in part on a quantity of L3 mobility measurements missed within the measurement period satisfying the threshold.

Aspect 2: The method of Aspect 1, wherein performing the adjusted mobility event detection procedure comprises applying one or more adjusted parameter values in association with detecting a mobility event.

Aspect 3: The method of Aspect 2, wherein the configuration indicates the one or more adjusted parameter values.

Aspect 4: The method of any of aspects Aspect 2-3, wherein the one or more adjusted parameter values include at least one of an adjusted hysteresis value or an adjusted time-to-trigger value.

Aspect 5: The method of any of Aspects 1-4, wherein performing the adjusted mobility event detection procedure comprises using a valid L3 mobility measurement in place of a missed L3 mobility measurement in association with detecting a mobility event.

Aspect 6: The method of Aspect 5, wherein the valid L3 mobility measurement is a last valid L3 mobility measurement prior to the missed L3 mobility measurement.

Aspect 7: The method of any of Aspects 1-6, wherein the configuration indicates the cell DTX pattern.

Aspect 8: The method of any of Aspects 1-7, wherein the configuration is received via at least one of DCI, a MAC control element, or RRC signaling.

Aspect 9: The method of any of Aspects 1-8, wherein the L3 mobility measurements missed within the measurement period comprise one or more missed CSI-RS measurements.

Aspect 10: The method of any of Aspects 1-9, wherein the L3 mobility measurements missed within the measurement period comprise one or more missed SSB measurements.

Aspect 11: The method of any of Aspects 1-10, wherein the adjusted mobility event detection procedure is associated with detecting a handover event during operation of the UE in a connected mode.

Aspect 12: The method of any of Aspects 1-11, wherein the adjusted mobility event detection procedure is associated with detecting a cell reselection event during operation of the UE in an idle mode or in an inactive mode.

Aspect 13: A method of wireless communication performed by a UE, comprising: receiving a configuration indicating that an inactive period of a cell DTX pattern is to be ignored; and performing a mobility event detection procedure based at least in part on the configuration indicating that the inactive period of the cell DTX pattern is to be ignored.

Aspect 14: A method of wireless communication performed by a UE, comprising: receiving a configuration for a signal to be received during an active period of a cell DTX pattern; receiving the signal during the active period of the cell DTX pattern based at least in part on the configuration; and performing a mobility event detection procedure based at least in part on an L3 measurement associated with the signal received during the active period of the DTX pattern.

Aspect 15: A method of wireless communication performed by a UE, comprising: receiving a configuration indicating that a signal is to be received during an inactive period of a cell DTX pattern; receiving the signal during the inactive period of the cell DTX pattern based at least in part on the configuration; and performing a mobility event detection procedure based at least in part on an L3 measurement associated with the signal received during the inactive period of the cell DTX pattern.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:
   a memory; and
   one or more processors, coupled to the memory, configured to:
   receive a configuration indicating a threshold for layer 3 (L3) measurements missed within a measurement period and during inactive periods of a cell discontinuous transmission (DTX) pattern; and
   perform an adjusted mobility event detection procedure based at least in part on a quantity of L3 mobility measurements missed within the measurement period satisfying the threshold.

2. The UE of claim 1, wherein the one or more processors, to perform the adjusted mobility event detection procedure, are configured to apply one or more adjusted parameter values in association with detecting a mobility event.

3. The UE of claim 2, wherein the configuration indicates the one or more adjusted parameter values.

4. The UE of claim 2, wherein the one or more adjusted parameter values include at least one of an adjusted hysteresis value or an adjusted time-to-trigger value.

5. The UE of claim 1, wherein the one or more processors, to perform the adjusted mobility event detection procedure, are configured to use a valid L3 mobility measurement in place of a missed L3 mobility measurement in association with detecting a mobility event.

6. The UE of claim 5, wherein the valid L3 mobility measurement is a last valid L3 mobility measurement prior to the missed L3 mobility measurement.

7. The UE of claim 1, wherein the configuration indicates the cell DTX pattern.

8. The UE of claim 1, wherein the configuration is received via at least one of downlink control information (DCI), a medium access control (MAC) control element, or radio resource control (RRC) signaling.

9. The UE of claim 1, wherein the L3 mobility measurements missed within the measurement period comprise one or more missed channel state information reference signal (CSI-RS) measurements.

10. The UE of claim 1, wherein the L3 mobility measurements missed within the measurement period comprise one or more missed synchronization signal block (SSB) measurements.

11. The UE of claim 1, wherein the adjusted mobility event detection procedure is associated with detecting a handover event during operation of the UE in a connected mode.

12. The UE of claim 1, wherein the adjusted mobility event detection procedure is associated with a cell reselection event during operation of the UE in an idle mode or in an inactive mode being detected.

13. A method of wireless communication performed by a user equipment (UE), comprising:
    receiving a configuration indicating a threshold for layer 3 (L3) measurements missed within a measurement period and during inactive periods of a cell discontinuous transmission (DTX) pattern; and
    performing an adjusted mobility event detection procedure based at least in part on a quantity of L3 mobility measurements missed within the measurement period satisfying the threshold.

14. The method of claim 13, wherein performing the adjusted mobility event detection procedure comprises applying one or more adjusted parameter values in association with detecting a mobility event.

15. The method of claim 14, wherein the configuration indicates the one or more adjusted parameter values.

16. The method of claim 14, wherein the one or more adjusted parameter values include at least one of an adjusted hysteresis value or an adjusted time-to-trigger value.

17. The method of claim 13, wherein performing the adjusted mobility event detection procedure comprises using a valid L3 mobility measurement in place of a missed L3 mobility measurement in association with detecting a mobility event.

18. The method of claim 17, wherein the valid L3 mobility measurement is a last valid L3 mobility measurement prior to the missed L3 mobility measurement.

19. The method of claim 13, wherein the configuration indicates the cell DTX pattern.

20. The method of claim 13, wherein the configuration is received via at least one of downlink control information (DCI), a medium access control (MAC) control element, or radio resource control (RRC) signaling.

21. The method of claim 13, wherein the L3 mobility measurements missed within the measurement period comprise one or more missed channel state information reference signal (CSI-RS) measurements.

22. The method of claim 13, wherein the L3 mobility measurements missed within the measurement period comprise one or more missed synchronization signal block (SSB) measurements.

23. The method of claim 13, wherein the adjusted mobility event detection procedure is associated with detecting a handover event during operation of the UE in a connected mode.

24. The method of claim 13, wherein the adjusted mobility event detection procedure is associated with detecting a cell reselection event during operation of the UE in an idle mode or in an inactive mode.

25. A non-transitory computer-readable medium storing a set of instructions for wireless communication, the set of instructions comprising:
   one or more instructions that, when executed by one or more processors of a user equipment (UE), cause the UE to:
      receive a configuration indicating a threshold for layer 3 (L3) measurements missed within a measurement period and during inactive periods of a cell discontinuous transmission (DTX) pattern; and
      perform an adjusted mobility event detection procedure based at least in part on a quantity of L3 mobility measurements missed within the measurement period satisfying the threshold.

26. The non-transitory computer-readable medium of claim 25, wherein the one or more instructions, that cause the UE to perform the adjusted mobility event detection procedure, cause the UE to apply one or more adjusted parameter values in association with detecting a mobility event.

27. The non-transitory computer-readable medium of claim 25, wherein the one or more instructions, that cause the UE to perform the adjusted mobility event detection procedure, cause the UE to use a valid L3 mobility measurement in place of a missed L3 mobility measurement in association with detecting a mobility event.

28. An apparatus for wireless communication, comprising:
   means for receiving a configuration indicating a threshold for layer 3 (L3) measurements missed within a measurement period and during inactive periods of a cell discontinuous transmission (DTX) pattern; and
   means for performing an adjusted mobility event detection procedure based at least in part on a quantity of L3 mobility measurements missed within the measurement period satisfying the threshold.

29. The apparatus of claim 28, wherein the means for performing the adjusted mobility event detection procedure comprises means for applying one or more adjusted parameter values in association with detecting a mobility event.

30. The apparatus of claim 28, wherein the means for performing the adjusted mobility event detection procedure comprises means for using a valid L3 mobility measurement in place of a missed L3 mobility measurement in association with detecting a mobility event.

* * * * *